(12) United States Patent
Duan

(10) Patent No.: US 12,443,283 B2
(45) Date of Patent: Oct. 14, 2025

(54) PROJECTION CONTROL METHOD AND ELECTRONIC DEVICE

(71) Applicant: Lenovo (Beijing) Limited, Beijing (CN)

(72) Inventor: Yong Duan, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 371 days.

(21) Appl. No.: 17/684,890

(22) Filed: Mar. 2, 2022

(65) Prior Publication Data
US 2023/0096088 A1 Mar. 30, 2023

(30) Foreign Application Priority Data

Sep. 30, 2021 (CN) .......................... 202111163802.0

(51) Int. Cl.
G06T 7/50 (2017.01)
G03H 1/00 (2006.01)
G06F 3/01 (2006.01)
G06T 7/70 (2017.01)
G09G 3/00 (2006.01)

(52) U.S. Cl.
CPC .......... *G06F 3/017* (2013.01); *G03H 1/0005* (2013.01); *G06T 7/50* (2017.01); *G06T 7/70* (2017.01); *G09G 3/002* (2013.01); *G03H 2001/0061* (2013.01); *G09G 2340/0407* (2013.01); *G09G 2340/0464* (2013.01)

(58) Field of Classification Search
None
See application file for complete search history.

(56) References Cited

U.S. PATENT DOCUMENTS

| 11,907,412 | B2 * | 2/2024 | Silverstein | ............ A63F 13/211 |
| 2016/0189364 | A1 * | 6/2016 | Aruga | ................ G02B 27/0172 345/8 |
| 2019/0188895 | A1 * | 6/2019 | Miller, IV | .............. H04N 7/157 |

* cited by examiner

Primary Examiner — Parul H Gupta
(74) Attorney, Agent, or Firm — ANOVA LAW GROUP, PLLC

(57) ABSTRACT

Projection control method, electronic device, and storage medium are provided. The projection control method includes obtaining a first depth data corresponding to a reference object; obtaining a second depth data corresponding to a remote object; determining a first scaling ratio corresponding to the remote object according to the first depth data and the second depth data; and performing a holographic projection on the remote object according to the first scaling ratio and the second depth data, to obtain a first projection image.

16 Claims, 5 Drawing Sheets

PROJECTION CONTROL METHOD AND ELECTRONIC DEVICE

CROSS-REFERENCE TO RELATED APPLICATION

This application claims the priority of Chinese patent applications No. 202111163802.0, filed on Sep. 30, 2021, the entirety of all of which is incorporated herein by reference.

FIELD OF THE DISCLOSURE

The present disclosure generally relates to the field of front-projected holographic display and, more particularly, relates to a projection control method and an electronic device.

BACKGROUND

Front-projected holographic display, also known as virtual imaging technology, is a technology that uses interference and diffraction principles to record and reproduce a real three-dimensional image of an object. A device that applies the front-projected holographic display refers to a holographic projection device.

With the development of the holographic projection device, user and the holographic projection image are capable of being located in a same space to interact with each other, thereby improving the interactivity of the holographic projection device. However, because the image source of the holographic projection image has various environmental conditions, an imaging ratio of the holographic projection image collected and generated at different environmental conditions is difficult to be controlled, which affects the interaction effect. The disclosed projection control method and electronic device are directed to solve one or more problems set forth above and other problems.

BRIEF SUMMARY OF THE DISCLOSURE

One aspect of the present disclosure includes a projection control method. The projection control method includes obtaining a first depth data corresponding to a reference object; obtaining a second depth data corresponding to a remote object; determining a first scaling ratio corresponding to the remote object according to the first depth data and the second depth data; and performing a holographic projection on the remote object according to the first scaling ratio and the second depth data, to obtain a first projection image.

Another aspect of the present disclosure includes an electronic device. The electronic device includes a memory storing program instructions for a projection control method; and a processor coupled with the memory and, when the program instructions being executed, configured to obtain first depth data corresponding to a reference object; obtain second depth data corresponding to a remote object; determine a first scaling ratio corresponding to the remote object according to the first depth data and the second depth data; and perform a holographic projection on the remote object according to the first scaling ratio and the second depth data, to obtain a first projection image.

Another aspect of the present disclosure includes a non-transitory computer-readable storage medium containing computer-executable instructions stored thereon. When being executed, the computer-executable instructions cause a processor to perform a projection control method. The method includes obtaining a first depth data corresponding to a reference object; obtaining a second depth data corresponding to a remote object; determining a first scaling ratio corresponding to the remote object according to the first depth data and the second depth data; and performing a holographic projection on the remote object according to the first scaling ratio and the second depth data, to obtain a first projection image.

Other aspects of the present disclosure can be understood by those skilled in the art in light of the description, the claims, and the drawings of the present disclosure.

BRIEF DESCRIPTION OF THE DRAWINGS

To more clearly illustrate the embodiments of the present disclosure, the drawings will be briefly described below. The drawings in the following description are certain embodiments of the present disclosure, and other drawings may be obtained by a person of ordinary skill in the art in view of the drawings provided without creative efforts.

DETAILED DESCRIPTION

Reference will now be made in detail to various embodiments of the disclosure, which are illustrated in the accompanying drawings. Wherever possible, the same reference numbers will be used throughout the drawings to refer to the same or the alike parts. The described embodiments are some but not all of the embodiments of the present disclosure. Based on some embodiments, persons of ordinary skill in the art may derive other embodiments consistent with the present disclosure, all of which are within the scope of the present disclosure.

The disclosed embodiments in the present disclosure are merely examples for illustrating the general principles of the disclosure. Any equivalent or modification thereof, without departing from the spirit and principle of the present disclosure, falls within the true scope of the present disclosure.

Figure 1:
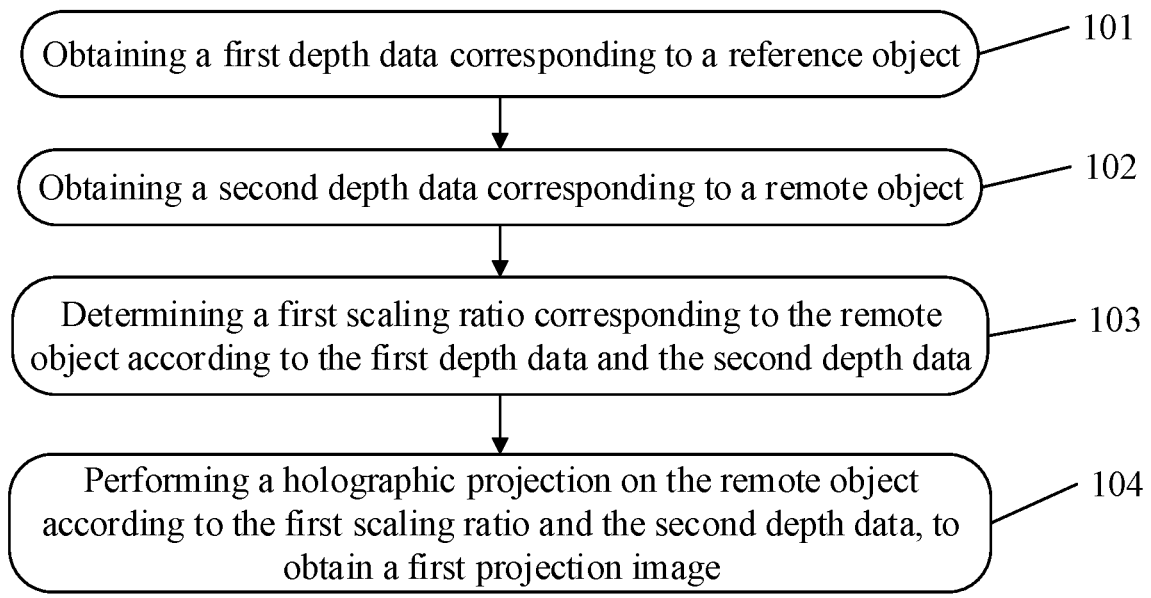
FIG. 1 illustrates a schematic flowchart of an exemplary projection control method consistent with some embodiments of the present disclosure.

The present disclosure provides a projection control method. FIG. 1 illustrates a schematic flowchart of a projection control method consistent with some embodiments of the present disclosure. Referring to FIG. 1, the method may include following.

Operation 101: obtaining first depth data corresponding to a reference object.

Operation 102: obtaining second depth data corresponding to a remote object.

Operation 103: determining a first scaling ratio corresponding to the remote object according to the first depth data and the second depth data.

Operation 104: performing a holographic projection on the remote object according to the first scaling ratio and the second depth data, to obtain a first projection image.

In the disclosed projection control method, the first depth data corresponding to the reference object and the second depth data corresponding to the remote object may be obtained, and then the relative difference between the reference object and the remote object may be determined by comparing the first depth data and the second depth data. Therefore, the first scaling ratio of the remote object may be determined according to the first depth data and the second depth data, and the holographic projection may be performed on the remote object on the basis of the reference object, to obtain the first projection image. Such obtained first projection image may have a correlation with the reference object, such that the first projection image may have desired projection effect.

The disclosed method may be applied to one of a holographic projection device and a control center of the holographic projection device. In the operation 101, in an implementation scenario, the holographic projection device may include a depth camera, and the reference object may be photographed by the depth camera to obtain the first depth data of the reference object. In another implementation scenario, the holographic projection device may not include the depth camera. In view of this, the holographic projection device may receive data from the depth camera to obtain the first depth data. It should be noted that the depth camera may be placed on any side around the reference object, which may be determined according to the placement needs of the depth camera in practical applications. For example, in an implementation scenario, the reference object may be a real object in the scene, and the reference object may be placed behind the screen used for holographic projection. In view of this, to prevent the reference object from being occluded, the depth camera may be placed behind or on a side of the reference subject. In another implementation scenario, the reference object may also be located remotely from the holographic projection device, and the reference object may also need to be projected. In view of this, the reference object may be placed in the green screen studio, and the depth camera may be placed in front of the reference object.

In the operation 102, similarly, the second depth data of the remote object may also need to be obtained by performing photographing and analyzing through the depth camera. The holographic projection device may or may not include the depth camera. In response to the holographic projection device not including the depth camera, the holographic projection device may obtain the second depth data transmitted from a third-party device through communication connection. It should be noted that a color camera may also be integrated into the depth camera, to capture specific appearance of the remote object. The holographic projection on the remote object may be realized by combining the data collected by the color camera and the second depth data.

In the operation 103, according to the first depth data and the second depth data, the actual shape difference between the reference object and the remote object, such as height difference, width difference, etc., may be determined. Based on this, the collected data of the remote object, in other words, the second depth data and any other data used for holographic projection, may be scaled down by a specific ratio based on the first depth data, to obtain the first scaling ratio.

In one embodiment, the first scaling ratio may be determined according to a preset projection ratio, and may be a proportional scaling or a non-proportional scaling corresponding to the reference object. For example, in a proportional scaling scene, according to the first depth data and the second depth data, it may be known that a height of the reference object may be 160 cm, and a height of the remote object may be 170 cm. In response to a height of the projection of the reference object on the screen being 160 cm, a height of the projection of the remote object on the screen may be set as 170 cm. In response to the height of the projection of the reference object on the screen being 16 cm, the height of the projection of the remote object on the screen may be set as 17 cm. Similarly, in a non-proportional scaling scene, the projection ratio of the remote object over the reference object may be set as 1:2, the height of the reference object may be 160 cm, and the height of the remote object may be 170 cm, in response to the height of the projection of the reference object on the screen being 160 cm, the height of the projection of the remote object on the screen may be set as 85 cm.

In the operation 104, according to the first scaling ratio, the data related to the holographic projection may be scaled down and the holographic projection may be performed to obtain the first projection image corresponding to the reference object. It should be understood that the first projection image may change in real time with the action of the remote object, to achieve the purpose of real-time projection.

The disclosed method may be applied to an interactive scene of an actual object and a virtual object. In other words, an actual reference object and a screen may be in the projection location, and a remote object that need to interact with the reference object may be in another location. Through the disclosed method, the remote object may be projected to the screen according to the specific ratio to interact with the reference object. Specifically, the interactive scene may include a projection conference, a projection classroom, etc.

The disclosed method may also be applied to an interactive scene of two virtual objects. In other words, the screen may be in the projection location, a first object that needs to be projected may be in a remote location, and a second object that needs to be projected may be in another remote location. The first object may refer to the reference object, and the second object may refer to the remote object. The two objects may be projected on the screen according to the specific ratio to achieve the interaction between the two objects. Specifically, the interactive scene may include a projection conference, a projection classroom, etc.

To facilitate the specific understanding of the foregoing embodiments, a specific implementation scenario may be provided below for description.

In the implementation scenario, the disclosed method may be applied to a smart classroom. Through the disclosed method, a remote teacher may be projected on the screen in response to the teacher in the classroom being lecturing. In view of this, the image of the remote teacher obtained by projection may be substantially realistic. Based on this, the remote teacher may communicate and interact with teacher in the classroom, to achieve teaching interaction and make classroom fun.

In one embodiment, in the operation 103, determining the first scaling ratio corresponding to the remote object according to the first depth data and the second depth data may include: determining a first projection contour and a first original height according to the first depth data; determining a second scaling ratio according to the first projection contour and the first original height; determining a second projection contour and a second original height according to the second depth data; and determining the first scaling ratio corresponding to the second projection contour according to the second original height and the second scaling ratio.

In the disclosed method, the first depth data corresponding to the reference object may be collected by a first depth camera, and the second depth data corresponding to the remote object may be collected by a second depth camera. By performing data analysis on the first depth data, contour and bone data corresponding to the reference object may be obtained. Similarly, by performing data analysis on the second depth data, contour and bone data corresponding to the remote object may be obtained. Through further analysis of the contour, the bone data and other data, the first original height corresponding to the reference object and the second original height corresponding to the remote object may be obtained by calculation, where the first original height may refer to an actual height of the reference object, and the second original height may refer to an actual height of the remote object.

Then, a projection simulation may be performed on the first depth data and other corresponding projection data to obtain the first projection contour of the reference object on the screen, and a projection simulation may be performed on the second depth data and other corresponding projection data to obtain the second projection contour of the remote object on the screen. It should be understood that each of the first projection contour and the second projection contour may be a simulated contour and may not be actually projected on the screen.

Through the comparison between the first original height and the first projection contour, it may be determined whether the reference object is scaled down on the screen, in other words, the second scaling ratio corresponding to the reference object may be obtained. It should be understood that in response to the reference object being a real object in the same scene as the projection device, the second scaling ratio may be set as 1. In other words, the default projection of the reference object on the screen may be an equal-scale projection. However, it should be understood that by adjusting the size of the first projection contour required by the reference object on the screen, the second scaling ratio may be adjusted.

After obtaining the second scaling ratio, the second projection contour may be scaled according to the second original height and the second scaling ratio, such that there may be a correlation between the second projection contour and the first projection contour, and the first scaling ratio may be obtained. The holographic projection may be performed on the remote object according to the first scaling ratio, to obtain the first projection image with proportional relation to the reference object.

Figure 2:
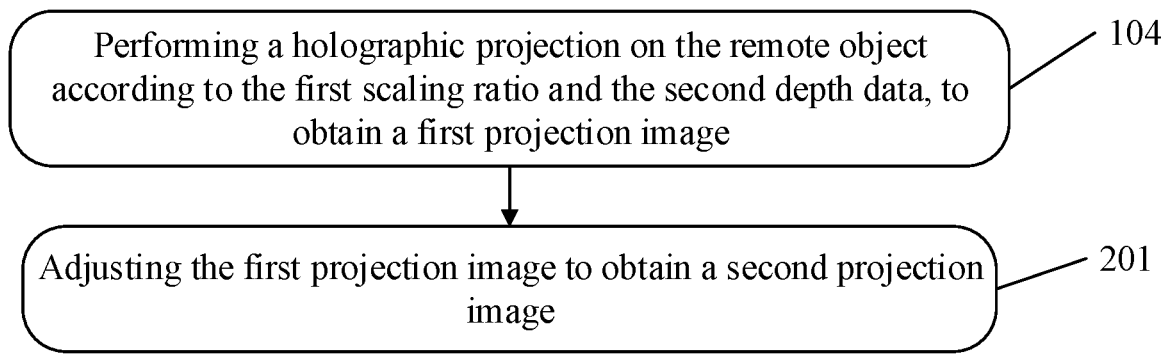
FIG. 2 illustrates a schematic flowchart of another exemplary projection control method consistent with some embodiments of the present disclosure.

FIG. 2 illustrates a schematic flowchart of another projection control method consistent with some embodiments of the present disclosure.

Referring to FIG. 2, in one embodiment, after obtaining the first projection image in the operation 104, the method may further include following.

Operation 201: adjusting the first projection image to obtain a second projection image.

To further improve the correlation between the projection of the remote object and the reference object, and to further improve the authenticity and interest of the projection, in the disclosed method, the first projection image may be adjusted according to the actual scene, to obtain the second projection image. The adjustment to the first projection image may include but may not be limited to color adjustment, size adjustment, position adjustment, etc.

Figure 3:
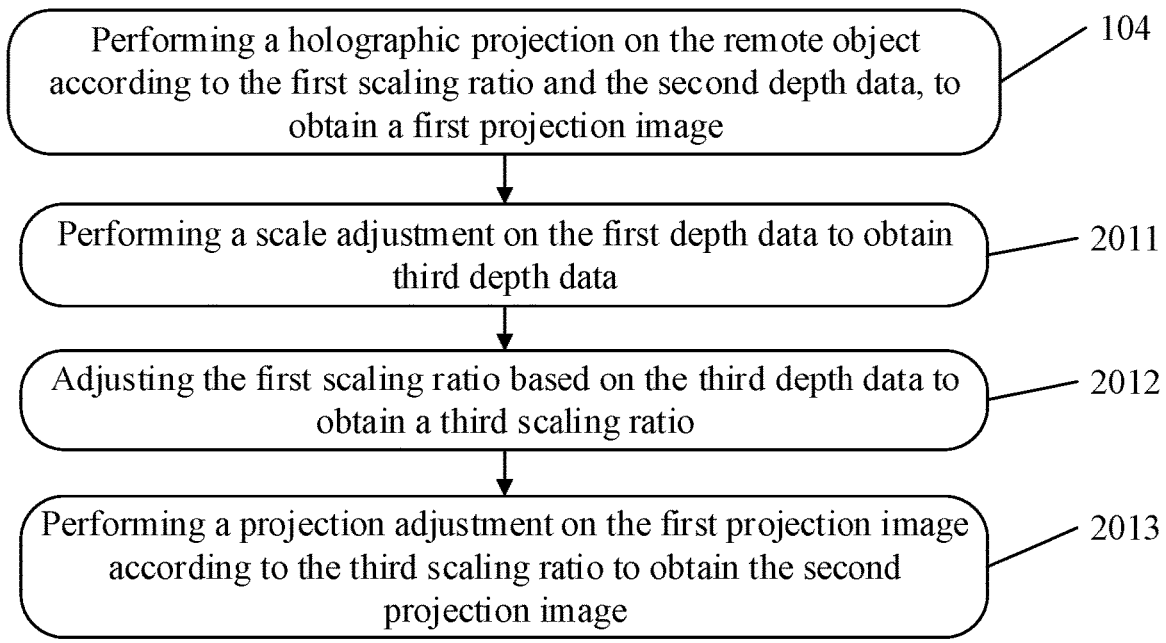
FIG. 3 illustrates a schematic flowchart of another exemplary projection control method consistent with some embodiments of the present disclosure.

FIG. 3 illustrates a schematic flowchart of another projection control method consistent with some embodiments of the present disclosure.

Referring to FIG. 3, in one embodiment, adjusting the first projection image to obtain the second projection image in the operation 201 may include following.

Operation 2011: performing a scale adjustment on the first depth data to obtain third depth data.

Operation 2012: adjusting the first scaling ratio based on the third depth data to obtain a third scaling ratio.

Operation 2013: performing a projection adjustment on the first projection image according to the third scaling ratio to obtain the second projection image.

In an implementation scenario, at least one item of the first depth data, the first projection contour and other data corresponding to the reference object may be adjusted, to achieve the projection adjustment on the first projection image, thereby improving the correlation between the reference object and the first projection image.

In the operation 2011 and the operation 2012, after obtaining the first depth data collected by the depth camera, the first depth data may be adjusted to obtain the third depth data. Specifically, the first depth data may be adjusted according to a preset or specific corresponding coefficient. Therefore, the first scaling ratio may be adjusted to obtain the third scaling ratio. It should be noted that in the disclosed method, the first projection contour may be adjusted according to a preset or specific corresponding coefficient, such that the first scaling ratio may be adjusted to obtain the third scaling ratio. In another implementation scenario, in the disclosed method, the first scaling ratio may be directly adjusted to obtain the third scaling ratio.

In the operation 2013, the projection adjustment may be performed on the first projection image according to the third scaling ratio, to obtain the second projection image. The method may also use various scaling methods to achieve the scaling of the first projection image, and the scaling methods may include but may not be limited to gradual scaling, instant scaling and any other scaling method.

Figure 4:
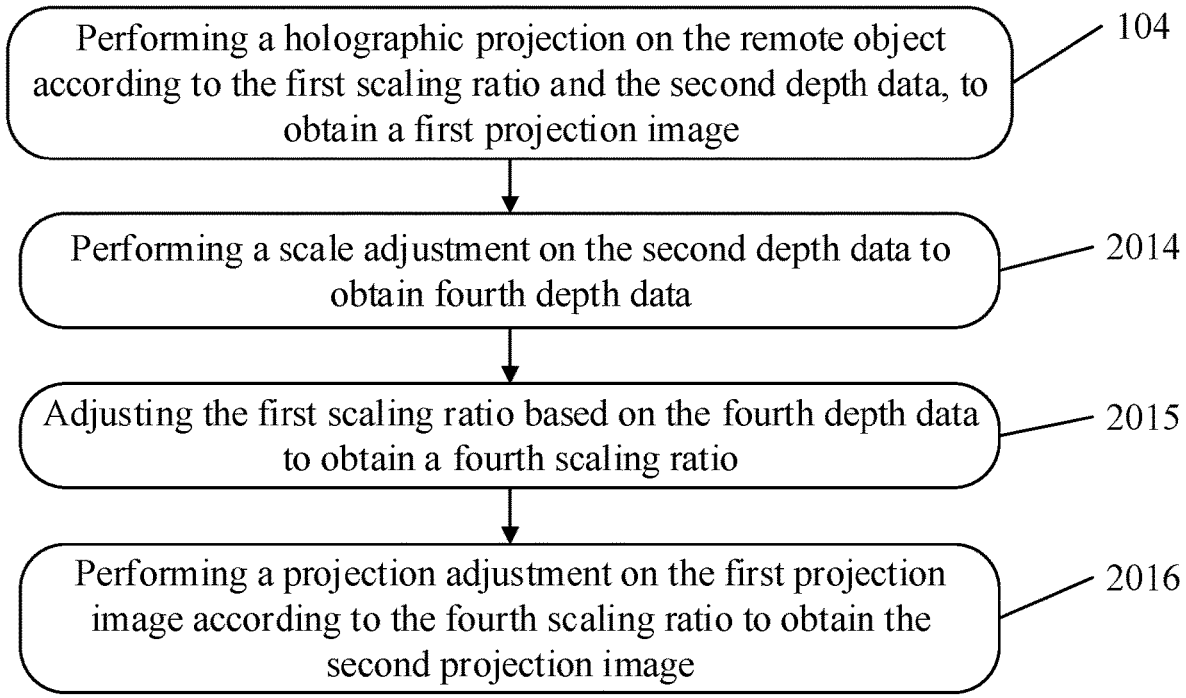
FIG. 4 illustrates a schematic flowchart of another exemplary projection control method consistent with some embodiments of the present disclosure.

FIG. 4 illustrates a schematic flowchart of another projection control method consistent with some embodiments of the present disclosure.

Referring to FIG. 4, in one embodiment, adjusting the first projection image to obtain the second projection image in the operation 201 may include following.

Operation 2014: performing a scale adjustment on the second depth data to obtain fourth depth data.

Operation 2015: adjusting the first scaling ratio based on the fourth depth data to obtain a fourth scaling ratio.

Operation 2016: performing a projection adjustment on the first projection image according to the fourth scaling ratio to obtain the second projection image.

In the disclosed method, at least one item of the second depth data, the second projection contour and other data corresponding to the remote object may be adjusted, to achieve the projection adjustment on the first projection image, thereby improving the variability of the first projection image. It should be noted that the adjustment method of the operations 2011-2013 and the adjustment method of the operations 2014-2016 in the disclosed method may be applied independently, sequentially, or simultaneously. In another embodiment, merely one of the adjustment method of the operations 2011-2013 and the adjustment method of the operations 2014-2016 may be applied. In the disclosed method, the data corresponding to the reference object and the data corresponding to the remote object may be adjusted simultaneously or successively. In another embodiment, merely the data corresponding to the reference object may be adjusted, or merely the data corresponding to the remote object may be adjusted.

In the disclosed method, in the process of adjusting the data corresponding to the remote object, the second depth data or the second projection contour may be adjusted through a preset or specific coefficient, to obtain the corresponding fourth depth data or the fourth projection contour. The first scaling ratio may be adjusted according to the fourth depth data or the fourth projection contour, to determine the corresponding fourth scaling ratio, and the projection adjustment may be performed on the first projection image according to the fourth scaling ratio to obtain the second projection image. Specifically, the scene that causes the scaling down may be based on a user gesture, based on an instruction of the audience or the user in the scene, based on preset of the projection device, or based on parameters generated when conditions are met, to adjust the data corresponding to the reference object and/or the remote object.

Figure 5:
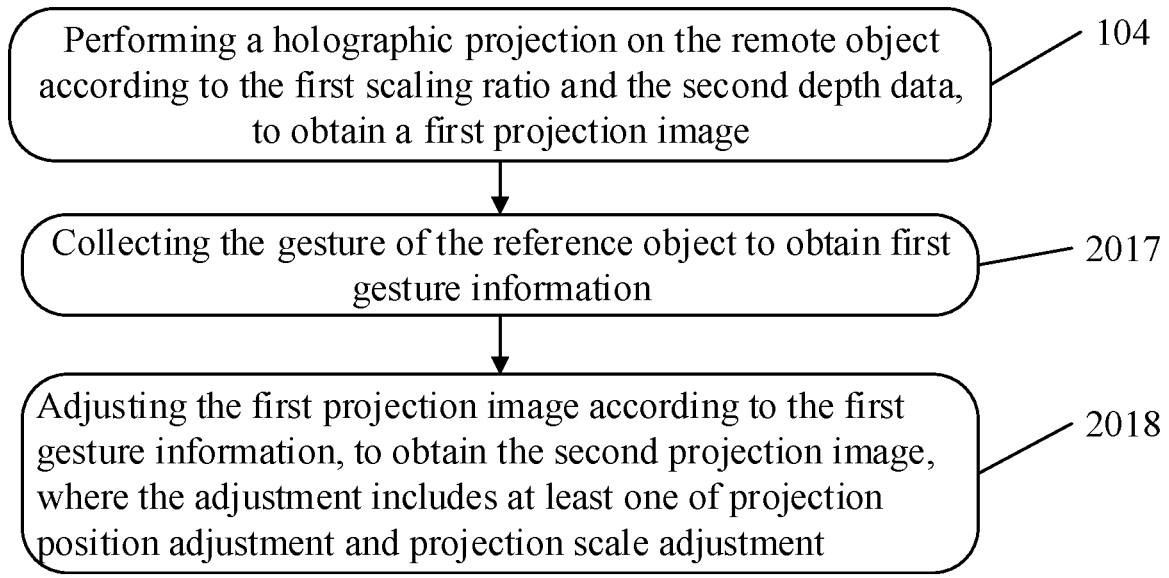
FIG. 5 illustrates a schematic flowchart of another exemplary projection control method consistent with some embodiments of the present disclosure.

FIG. 5 illustrates a schematic flowchart of another projection control method consistent with some embodiments of the present disclosure.

Referring to FIG. 5, in one embodiment, adjusting the first projection image to obtain the second projection image in the operation 201 may include following.

Operation 2017: collecting a gesture of the reference object to obtain first gesture information.

Operation 2018: adjusting the first projection image according to the first gesture information, to obtain the second projection image. The adjustment may include at least one of a projection position adjustment and a projection scale adjustment.

In an implementation scenario, the adjustment on the first projection image may be triggered by the gesture of the reference object. For example, the corresponding gesture of the reference object may be collected by an image acquisition device. When the reference object poses a specific gesture, a corresponding adjustment mode may be determined according to the gesture, to achieve the adjustment on the first projection image. It should be noted that in another implementation scenario, in the disclosed method, gestures of the remote object, audience or user watching the projection may be collected, to achieve the adjustment on the first projection image. Adjusting the first projection image may include adjusting the position of the first projection image on the screen, adjusting the size of the first projection image on the screen, adjusting the brightness of the first projection image on the screen, or adjusting the color of the first projection image on the screen.

It should be understood that operations 2017-2018 in the disclosed method may be performed before operations 2011-2013 and/or operations 2014-2016. Specifically, in the disclosed method, the adjustment operation may be triggered by the operation 2017, and then the adjustment on the first projection image may be achieved through operations 2011-2013 and/or operations 2014-2016.

For example, in an implementation scenario applied to a smart classroom, a local teacher may make a gesture, and then the remote teacher may be presented at the hand of the local teacher in a reduced posture. The local teacher may make a swipe gesture, to make the remote teacher zoom in and stand beside the local teacher. The local teacher may push hard, to push the remote teacher to an end of the screen away from the local teacher, etc., which may not be repeated herein.

It should be understood that based on the adjustment method of the first projection image, in an implementation scenario, the adjustment on the first projection image may be performed multiple times. Based on this, in the disclosed method, the adjusted second projection image may be re-determined as the first projection image, to achieve multiple adjustments on the projection image corresponding to the remote object.

In one embodiment, adjusting the first projection image to obtain the second projection image in the operation 201 may include: first, performing a gesture collection on the gesture of the reference object to obtain second gesture information; then, determining a first virtual object according to the second gesture information; and further, performing the holographical projection on the first virtual object according to the first scaling ratio, to obtain a first interactive image for interaction between the reference object and the remote object.

Gesture of the reference object may also be configured to achieve the purpose of projecting other projection patterns. For example, according to the gesture of the reference object, background projection images such as blackboard, teaching aid, three-dimensional formula, green field, balloon, sun and any other background may be projected around the first projection image, to increase the interest of projection. It should be understood that the gesture may also be triggered by the remote object. In response to performing the projection of the background projection image, at least one of the reference object, the remote object, and the first projection image may be used as the projection basis to determine a corresponding scaling ratio.

Further, in the disclosed method, the first interactive image for the interaction between the reference object and the remote object may be projected. It should be understood that the first interactive image may first need to be scaled down according to the scaling ratio of the reference object over the remote object, i.e., the first scaling ratio, to achieve better interaction between the reference object and the remote object. For example, the reference object and the remote object may be in a proportional scaling. In response to the first interactive image being a tug-of-war rope, the reference object may hold one end of the tug-of-war rope and the remote object may hold another end of the tug-of-war rope. In view of this, the two ends of the first interactive image may also be in the proportional scaling. In response to the scaling ratio of the reference object over the remote object being 2:1, the scaling ratio of one end over another end of the tug-of-war rope may be set as 2:1, and the middle may be presented in a uniform transition. In view of this, in the case where the reference object interacts with the remote object, the first interactive image may not produce an excessive sense of incongruity.

In one embodiment, after obtaining the first interactive image for the interaction between the reference object and the remote object, the method may further include: first, performing interactive gesture collection on the reference object and the remote object, to obtain third gesture information; and then performing a projection adjustment on the first interactive image according to the third gesture information, to obtain a second interactive image.

It should be understood that for some interactive scenes, in response to the reference object interacting with the remote object, the projected first interactive image may change in shape. For example, during the tug-of-war, the rope may be stretched in response to both parties exerting force. In response to an elastic material being squeezed from two sides, the elastic material may be compressed. In response to a spring scale being pulled, a distance between two ends of the spring may increase. Based on this, in response to the first interactive image being an interactive image with a variable shape, in the disclosed method, by collecting the interactive gesture of the reference object and the remote object, it may be determined whether the projection adjustment needs to be performed on the first interactive image to change the shape thereof. Further, the shape adjustment of the first interactive image may be a gradual transformation adjustment, to avoid producing sense of incongruity during the interactive process.

To facilitate further understanding of the above-mentioned embodiments, a specific implementation scenario may be provided below. In the implementation scenario, the reference object may be a local teacher, and the remote object may be a remote teacher. The reference object and the remote object may be projected in a proportional ratio of 1:1. A camera device may collect the action of the local teacher, and in response to the projection device determining the second gesture information according to the collected action, a spring scale may be projected on the screen, and the two ends of the spring scale may be hold by the local teacher and the remote teacher, respectively. Then, the camera device may continue to collect the action of the local teacher, and in response to the projection device determining the third gesture information according to the collected action, the projection adjustment may be performed on the spring scale to change the shape thereof, such that the two ends of the spring scale may be extended. In view of this, the spring scale may be extended to both sides under the cooperation of the local teacher and the remote teacher, to achieve the purpose of demonstrating the relevant knowledge of force to students.

In one embodiment, adjusting the first projection image to obtain the second projection image may include: first, determining first position information corresponding to the reference object; then, determining second position information corresponding to the remote object; moreover, determining overlapped position information according to the first position information and the second position information; and further, performing a mask processing on the first projection image according to the overlapped position information, to obtain the second projection image.

In response to the reference object being a real object and the remote object being the projection object, because the screen used for holographic projection is often a transparent screen, to avoid blocking the projection light, the real object may need to be located behind the screen. In view of this, in response to the remote object and the reference object moving around, the remote object and the reference object may tend to be overlapped. In response to the remote object overlapping the reference object, the real object may be presented behind the first projection image, which may affect the projection effect. Based on this, in the disclosed method, according to the first position information corresponding to the reference object and the second position information corresponding to the remote object, the position of the first projection image corresponding to the reference object and the remote object may be determined, and according to the first position information and the second position information, it may be determined whether the reference object overlaps the first projection image. In other words, in response to the reference object overlapping the first projection image, the overlapped position information may include that the reference object overlaps the first projection image, and in response to the reference object not overlapping the first projection image, the overlapped position information may include that the reference object does not overlap the first projection image. In response to the overlapped position information including that the reference object overlaps the first projection image, the mask processing may need to be performed on the first projection image, to obtain the second projection image, thereby preventing the reference object from being presented behind the first projection image, and improving the projection quality.

To facilitate the overall understanding of the foregoing embodiments, a specific implementation scenario may be provided below.

Figure 6A:
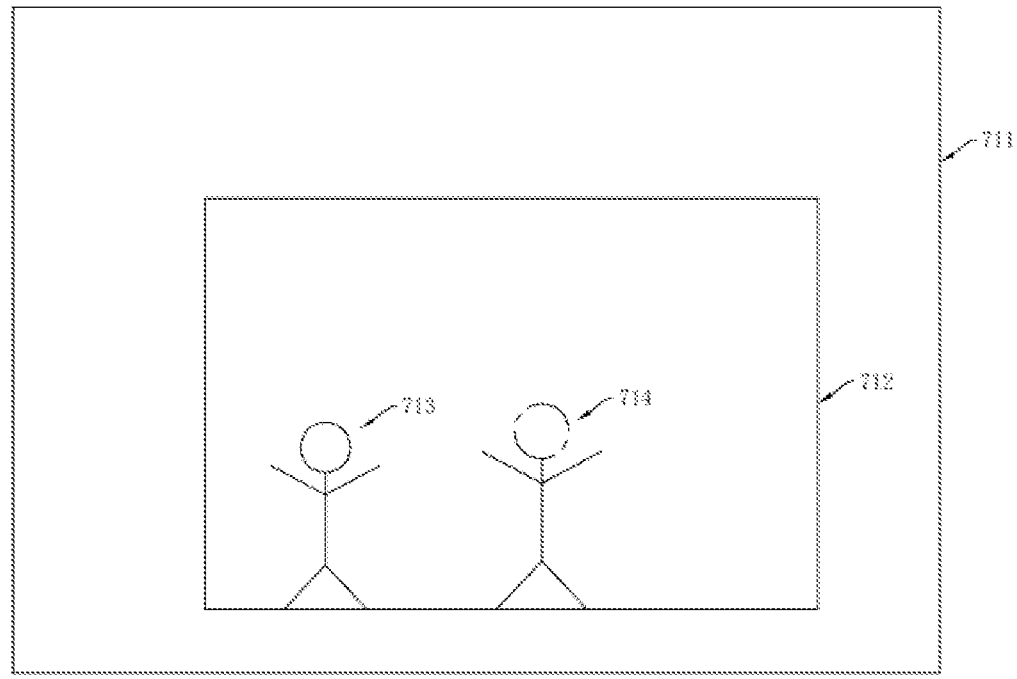
FIG. 6A illustrates a schematic diagram of a first implementation scene of an exemplary projection control method consistent with some embodiments of the present disclosure.
Figure 6B:
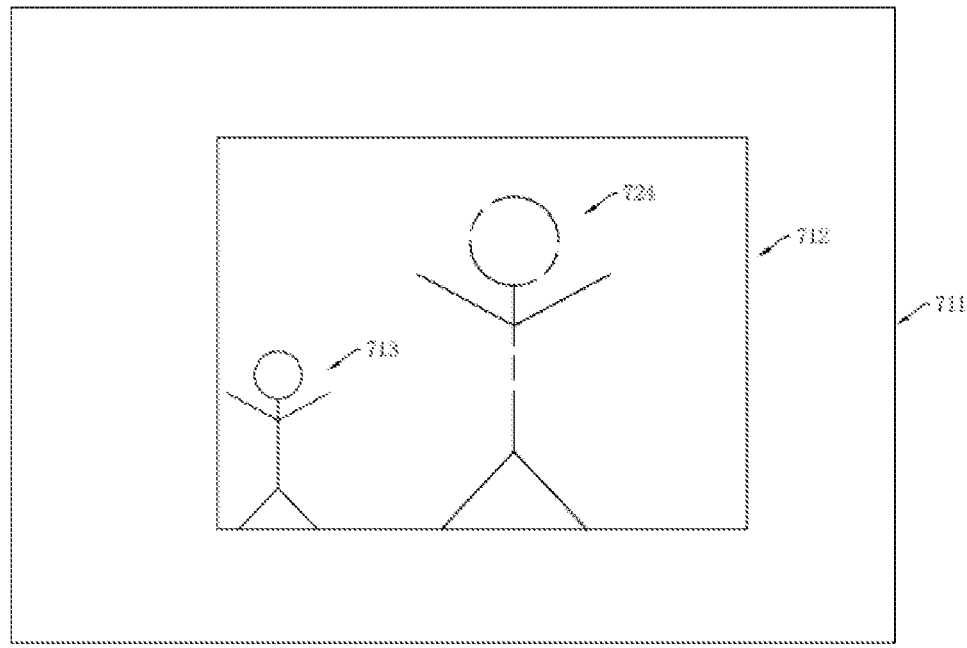
FIG. 6B illustrates a schematic diagram of a second implementation scene of another exemplary projection control method consistent with some embodiments of the present disclosure.

FIG. 6A illustrates a schematic diagram of a first implementation scene of a projection control method consistent with some embodiments of the present disclosure; FIG. 6B illustrates a schematic diagram of a second implementation scene of the projection control method; and FIG. 6C illustrates a schematic diagram of a third implementation scene of the projection control method.

Figure 6C:
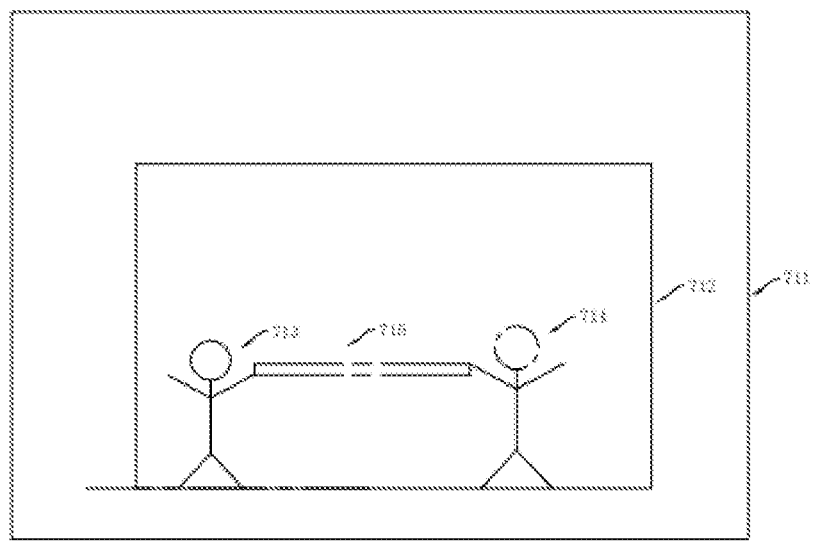
FIG. 6C illustrates a schematic diagram of a third implementation scene of another exemplary projection control method consistent with some embodiments of the present disclosure.

In one embodiment, referring to FIGS. 6A-6C, the disclosed projection control method may be applied to a smart classroom 711. In the smart classroom 711, a transparent screen 712 for the holographic projection, such as a transparent glass screen, may be provided, and a projection device (not shown in the Figure) for the holographic projection may be provided at a corresponding position. The projection device may be configured to project a holographic image on the transparent screen 712.

In response to a local teacher 713 starting an interactive class with a remote teacher to teach the students, the local teacher 713 may stand right behind the transparent screen 712. The remote teacher may be in a remote classroom, which may be a green screen studio. The projection device may project the first projection image 714 corresponding to the remote teacher on the transparent screen 712 through the holographic projection method, such that the students may have visual experience where the local teacher 713 and the remote teacher may appear in the same smart classroom.

Referring to FIG. 6A, first, the first depth data corresponding to the local teacher 713 may be collected by a depth camera in the smart classroom, and the second depth data corresponding to the remote teacher may be collected by a depth camera in the remote classroom. Then, a first actual height of the local teacher may be analyzed according to the first depth data, and the first projection contour of the local teacher 713 on the transparent screen 712 may be simulated. The ratio of the second projection contour corresponding to the remote teacher on the transparent screen 712 may be determined according to the first actual height and the first projection contour. Both the remote teacher and the local teacher may be projected on the transparent screen 712 in an equal-scale projection, to form the first projection image 714 on the transparent screen 712, which may prevent the difference in height and contour between the remote teacher and the local teacher 713 from being too large to affect the visual experience of students.

Referring to FIG. 6A and FIG. 6B, during the teaching process of the first projection image 714 corresponding to the remote teacher and the local teacher 713, the first projection image 714 may be adjusted by collecting the gesture of the local teacher 713. In response to collecting a preset first specific gesture drawn by the local teacher 713, the first projection image 714 may be enlarged to obtain a second projection image 724. In response to collecting a preset second specific gesture drawn by the local teacher 713, the second projection image 724 may be zoomed out to restore the first projection image 714.

Referring to FIG. 6A and FIG. 6C, during the teaching process of the first projection image 714 corresponding to the remote teacher and the local teacher 713, an interactive projection image 715 for the interaction between the first projection image 714 and the local teacher 713 may be added according to the gesture of the local teacher 713. The interactive projection image 715 may be preset to be projected in an equal-scale projection according to the ratio of the local teacher 713 over the first projection image 714, to facilitate the coordination between the local teacher 713 and the first projection image 714 as well as the interactive projection image 715. It should be understood that the shape and scale of the interactive projection image 715 may also be changed according to the gesture of the local teacher 713.

The present disclosure also provides an electronic device. The electronic device may include a memory storing program instructions for a projection control method; and a processor coupled with the memory. When the program instructions being executed, the processor is configured to perform the disclosed method.

Figure 7:
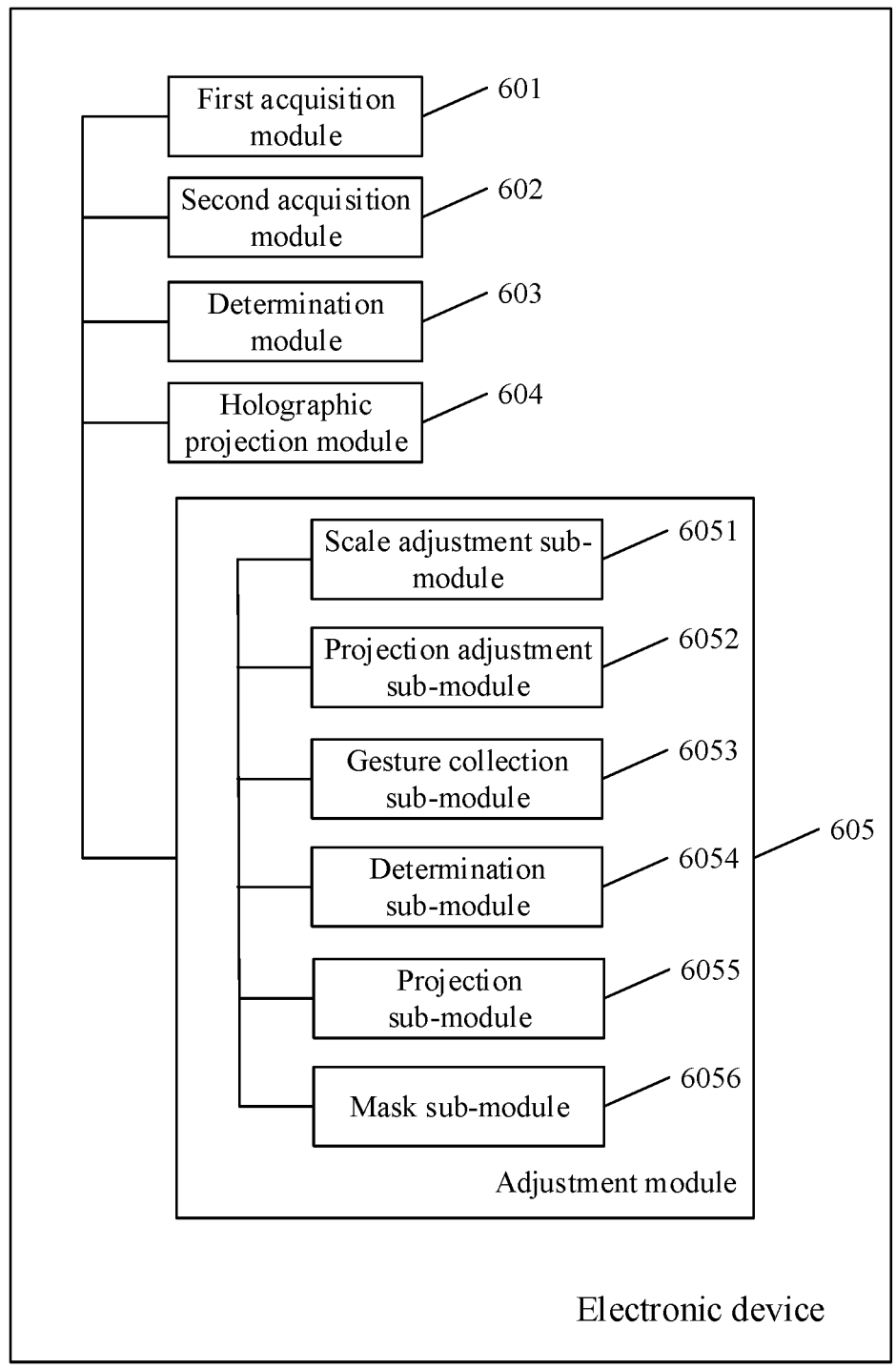
FIG. 7 illustrates a schematic diagram of an implementation module of an exemplary electronic device consistent with some embodiments of the present disclosure.

FIG. 7 illustrates a schematic diagram of an implementation module of an electronic device consistent with some embodiments of the present disclosure. Referring to FIG. 7, the electronic device may include a first acquisition module 601 configured to obtain first depth data corresponding to a reference object; a second acquisition module 602 configured to obtain second depth data corresponding to a remote object; a determination module 603 configured to determine a first scaling ratio corresponding to the remote object according to the first depth data and the second depth data; and a holographic projection module 604 configured to perform a holographic projection on the remote object according to the first scaling ratio and the second depth data, to obtain a first projection image.

In one embodiment, the determination module 603 may be configured to: determine a first projection contour and a first original height according to the first depth data; determine a second scaling ratio according to the first projection contour and the first original height; determine a second projection contour and a second original height according to the second depth data; and determine the first scaling ratio corresponding to the second projection contour according to the second original height and the second scaling ratio.

In one embodiment, the electronic device may further include an adjustment module 605 configured to adjust the first projection image to obtain a second projection image.

In one embodiment, the adjustment module 605 may include a scale adjustment sub-module 6051 and a projection adjustment sub-module 6052. The scale adjustment sub-module 6051 may be configured to perform a scale adjustment on the first depth data to obtain third depth data; and adjust the first scaling ratio based on the third depth data to obtain a third scaling ratio. The projection adjustment sub-module 6052 may be configured to perform a projection adjustment on the first projection image according to the third scaling ratio to obtain the second projection image.

In another embodiment, the scale adjustment sub-module 6051 may be configured to perform a scale adjustment on the second depth data to obtain fourth depth data; and adjust the first scaling ratio based on the fourth depth data to obtain a fourth scaling ratio. The projection adjustment sub-module 6052 may be configured to perform a projection adjustment on the first projection image according to the fourth scaling ratio to obtain the second projection image.

In one embodiment, the adjustment module 605 may further include a gesture collection sub-module 6053. The gesture collection sub-module 6053 may be configured to obtain first gesture information by collecting a gesture of the reference object. The projection adjustment sub-module 6052 may be further configured to adjust the first projection image according to the first gesture information, to obtain the second projection image. The adjustment may include at least one of a projection position adjustment and a projection scale adjustment.

In one embodiment, the gesture collection sub-module 6053 may be further configured to obtain second gesture information by performing a gesture collection on the gesture of the reference object. In one embodiment, the adjustment module 605 may further include a determination sub-module 6054 and a projection sub-module 6055. The determination sub-module 6054 may be configured to determine a first virtual object according to the second gesture information. The projection sub-module 6055 may be configured to perform the holographic projection on the first virtual object according to the first scaling ratio, to obtain a first interactive image for the interaction between the reference object and the remote object.

In one embodiment, the gesture collection sub-module 6053 may be further configured to obtain third gesture information by performing an interactive gesture collection on the reference object and the remote object. The projection adjustment sub-module 6052 may be further configured to perform a projection adjustment on the first interactive image according to the third gesture information to obtain a second interactive image.

In one embodiment, the determination sub-module 6054 may be further configured to: determine first position information corresponding to the reference object; determine second position information corresponding to the remote object; and determine overlapped position information according to the first position information and the second position information. The adjustment module 605 may further include a mask sub-module 6056. The mask sub-module 6056 may be configured to perform a mask processing on the first projection image according to the overlapped position information, to obtain the second projection image.

It should be noted that the terms "include", "contain" or any variant may be intended to cover non-exclusive inclusion, such that a process, a method, an article, or a device that includes a series of elements may not only include such elements, but also include any other element that is not clearly listed, or may include elements inherent to such process, method, article or device. In a case without more restrictions, the element defined by the sentence "including . . . " may not exclude the existence of any other same element in the process, method, article, or device that includes the element.

The device and method described in the above embodiments may be realized through other approaches. That is, the description on the methods and devices in the above embodiments may only be schematic examples. For instance, the components or units may be merely defined based on their logical functions, and in actual applications, the components or units may be defined based on other criteria. For example, multiple units or components may be composited together or be integrated into another system, or some features may be ignored or may not be executed. Moreover, the coupling between the units and components illustrated or discussed above may be direct coupling or communication connections through some indirect coupling or communication connections between interfaces, devices, or units. The coupling may be electrical, mechanical, or in any other appropriate form.

The components or units described separately above, may or may not be physically separated. Each component illustrated and discussed above as a unit may or may not be a physical unit. That is, the component may be located at a certain position, or may be distributed to multiple network units. Moreover, based on the needs of actual applications, all or a part of the units may be used to realize the methods consistent with disclosed embodiments.

Further, various functional units discussed in the disclosed embodiments may be integrated in a single processing unit or may be physically independent from each other. In addition, a plurality of units formed by integrating two or more than two functional units together may further form a processing unit. The integrated units described above may be realized through hardware or through software functional units.

All or a part of the steps to implement the above embodiments may be realized by hardware related to program instructions, and the aforementioned program instructions may be stored in a computer-readable storage medium. When the program instructions are executed, the steps included in the above embodiments may be executed. The storage media may include U disk, mobile hard disk, read-only memory (ROM), random access memory (RAM), magnetic disk, optical disk, or any other appropriate media that can be used to store program code.

When the integrated units are realized through software functional units, and are sold and used as independent products, the integrated units may be stored on computer readable storage media. Based on this understanding, all or a part of the generic principles or the scope of the invention may be embodied in software products. The computer software products may be stored in storage media and may include a plurality of commands to instruct a computer system (such as personal computer, server, network system, etc.) or a processor to execute all or a part of the procedures described in various embodiments consistent with the present disclosure. The storage media may include U disk, mobile hard disk, read-only memory (ROM), random access memory (RAM), magnetic disk, optical disk, or any other appropriate media that can be used to store program code.

The description of some embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A projection control method, comprising:
   obtaining a first depth data corresponding to a reference object;
   obtaining a second depth data corresponding to a remote object;
   determining a second scaling ratio associated with a ratio of a height of a projection of the reference object to a height of the reference object;
   determining a first scaling ratio corresponding to the remote object according to the first depth data and the second depth data, the first scaling ratio being associated with a ratio of a height of a first projection image of the remote object to a height of the remote object; and
   performing a holographic projection of the remote object according to the first scaling ratio and the second depth data, to obtain the first projection image, such that the height of the first projection image is based at least in part on the height of the remote object and a ratio of the first scaling ratio to the second scaling ratio is a predetermined ratio, wherein the projection control method further comprises:
   performing a gesture collection on a gesture of the reference object to obtain second gesture information;
   determining a first virtual object according to the second gesture information, the first virtual object is different from the reference object and the remote object;
   performing the holographical projection of the first virtual object according to the first scaling ratio, to obtain a first interactive image of the first virtual object for interaction between the reference object and the remote object;
   performing an interactive gesture collection on the reference object and the remote object, to obtain third gesture information; and
   performing a projection adjustment on the first interactive image according to the third gesture information, to obtain a second interactive image of the first virtual object.

2. The method according to claim 1, wherein determining the first scaling ratio corresponding to the remote object according to the first depth data and the second depth data includes:
   determining a first projection contour and a first original height of the reference object according to the first depth data,
   wherein the second scaling ratio is determined according to the first projection contour and the first original height of the reference object; and
   determining a second projection contour and a second original height of the remote object according to the second depth data,
   wherein the first scaling ratio corresponding to the second projection contour is determined according to the second original height of the remote object and the second scaling ratio.

3. The method according to claim 1, further including:
   adjusting the first projection image to obtain a second projection image.

4. The method according to claim 3, wherein adjusting the first projection image to obtain the second projection image includes:
   performing a scale adjustment on the first depth data to obtain third depth data;

adjusting the first scaling ratio based on the third depth data to obtain a third scaling ratio; and
performing a projection adjustment on the first projection image according to the third scaling ratio to obtain the second projection image.

5. The method according to claim 3, wherein adjusting the first projection image to obtain the second projection image includes:
performing a scale adjustment on the second depth data to obtain fourth depth data;
adjusting the first scaling ratio based on the fourth depth data to obtain a fourth scaling ratio; and
performing a projection adjustment on the first projection image according to the fourth scaling ratio to obtain the second projection image.

6. The method according to claim 3, wherein adjusting the first projection image to obtain the second projection image includes:
collecting a gesture of the reference object to obtain first gesture information; and
adjusting the first projection image according to the first gesture information, to obtain the second projection image, wherein the adjusting includes at least one of a projection position adjustment and a projection scale adjustment.

7. The method according to claim 3, wherein adjusting the first projection image to obtain the second projection image includes:
determining first position information corresponding to the reference object;
determining second position information corresponding to the remote object;
determining overlapped position information according to the first position information and the second position information; and
performing a mask processing on the first projection image according to the overlapped position information, to obtain the second projection image.

8. An electronic device, comprising:
a memory storing program instructions for a projection control method; and
a processor coupled with the memory and, when the program instructions being executed, configured to:
obtain first depth data corresponding to a reference object;
obtain second depth data corresponding to a remote object;
determine a second scaling ratio associated with a ratio of a height of a projection of the reference object to a height of the reference object;
determine a first scaling ratio corresponding to the remote object according to the first depth data and the second depth data, the first scaling ratio being associated with a ratio of a height of a first projection image of the remote object to a height of the remote object; and
perform a holographic projection of the remote object according to the first scaling ratio and the second depth data, to obtain the first projection image, such that the height of the first projection image is based at least in part on the height of the remote object and a ratio of the first scaling ratio to the second scaling ratio is a predetermined ratio, wherein:
the projection control method further comprises:
performing a gesture collection on a gesture of the reference object to obtain second gesture information;

determining a first virtual object according to the second gesture information, the first virtual object is different from the reference object and the remote object;
performing the holographical projection of the first virtual object according to the first scaling ratio, to obtain a first interactive image of the first virtual object for interaction between the reference object and the remote object;
performing an interactive gesture collection on the reference object and the remote object, to obtain third gesture information; and
performing a projection adjustment on the first interactive image according to the third gesture information, to obtain a second interactive image of the first virtual object.

9. The electronic device according to claim 8, wherein the processor is further configured to:
determine a first projection contour and a first original height of the reference object according to the first depth data,
wherein the second scaling ratio is determined according to the first projection contour and the first original height of the reference object; and
determine a second projection contour and a second original height of the remote object according to the second depth data,
wherein the first scaling ratio corresponding to the second projection contour is determined according to the second original height of the remote object and the second scaling ratio.

10. The electronic device according to claim 8, wherein the processor is further configured to:
adjust the first projection image to obtain a second projection image.

11. The electronic device according to claim 10, wherein the processor is further configured to:
perform a scale adjustment on the first depth data to obtain third depth data, and adjust the first scaling ratio based on the third depth data to obtain a third scaling ratio; and
perform a projection adjustment on the first projection image according to the third scaling ratio to obtain the second projection image.

12. The electronic device according to claim 11, wherein the processor is further configured to:
perform the scale adjustment on the second depth data to obtain fourth depth data, and adjust the first scaling ratio based on the fourth depth data to obtain a fourth scaling ratio; and
perform the projection adjustment on the first projection image according to the fourth scaling ratio to obtain the second projection image.

13. The electronic device according to claim 11, wherein the processor is further configured to:
obtain first gesture information by collecting a gesture of the reference object; and
adjust the first projection image according to the first gesture information, to obtain the second projection image, wherein the adjustment includes at least one of a projection position adjustment and a projection scale adjustment.

14. The electronic device according to claim 13, wherein the processor is further configured to:
determine first position information corresponding to the reference object;

determine second position information corresponding to the remote object; and determine overlapped position information according to the first position information and the second position information.

15. The electronic device according to claim 14, wherein the processor is further configured to:

perform a mask processing on the first projection image according to the overlapped position information, to obtain the second projection image.

16. A non-transitory computer-readable storage medium containing computer-executable instructions stored thereon, wherein, when being executed, the computer-executable instructions cause a processor to perform a projection control method, the method comprising:

obtaining a first depth data corresponding to a reference object;

obtaining a second depth data corresponding to a remote object;

determining a second scaling ratio associated with a ratio of a height of a projection of the reference object to a height of the reference object;

determining a first scaling ratio corresponding to the remote object according to the first depth data and the second depth data, the first scaling ratio being associated with a ratio of a height of a first projection image of the remote object to a height of the remote object; and performing a holographic projection of the remote object according to the first scaling ratio and the second depth data, to obtain the first projection image, such that the height of the first projection image is based at least in part on the height of the remote object and a ratio of the first scaling ratio to the second scaling ratio is a predetermined ratio, wherein the projection control method further comprises:

performing a gesture collection on a gesture of the reference object to obtain second gesture information;

determining a first virtual object according to the second gesture information, the first virtual object is different from the reference object and the remote object;

performing the holographical projection of the first virtual object according to the first scaling ratio, to obtain a first interactive image of the first virtual object for interaction between the reference object and the remote object;

performing an interactive gesture collection on the reference object and the remote object, to obtain third gesture information; and performing a projection adjustment on the first interactive image according to the third gesture information, to obtain a second interactive image of the first virtual object.

* * * * *